United States Patent Office 3,344,488
Patented Oct. 3, 1967

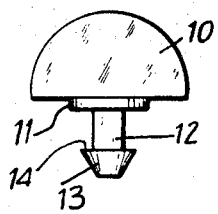
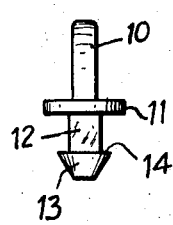
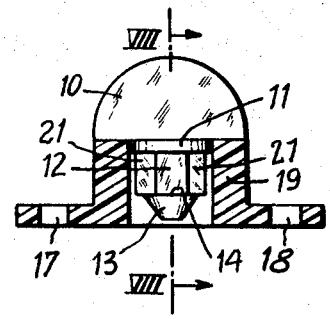
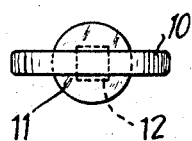
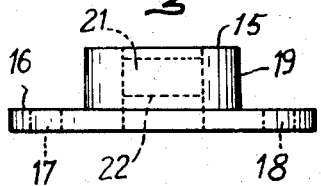
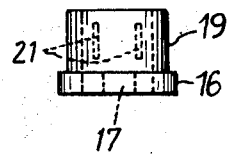
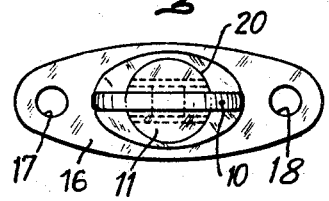
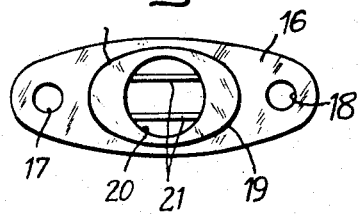
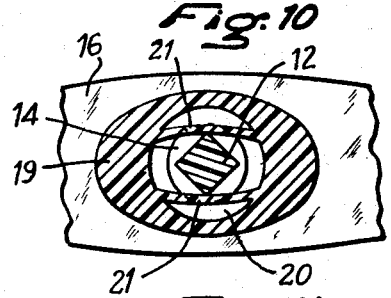
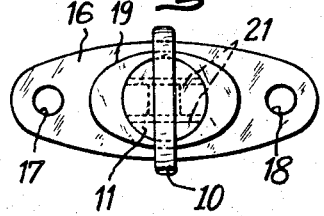
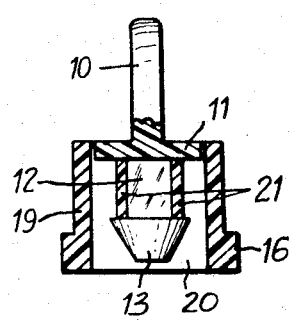

3,344,488
SEPARABLE HEAD AND SOCKET FASTENER
ELEMENTS
Jean Pierre Texier, Neuilly-sur-Seine, Seine, France, assignor to Pyraplastic (Société à Résponsabilité Limitée) Paris, France, a corporation of France
Claims priority, application France, Dec. 22, 1964, 999,573
Filed June 28, 1965, Ser. No. 467,286
3 Claims. (Cl. 24—221)

ABSTRACT OF THE DISCLOSURE

The device of this invention includes pre-formed plastic fastener elements, one of which includes a collar containing parallel integral distortable means disposed therewithin and the other including an operator which is assemblable into locking engagement with the distortable means, said operator being rotatable relative to the distortable means to permit assembly of an eyelet over said collar.

This invention relates to improvements in fastener components which comprise head and socket members and more particularly to plastic fastener means of the type adapted to retain a tarpaulin, canvas or other cover in a taut condition.

It is known to utilize various types of fastener members to secure a cover means relative to a receptacle whether mobile or not and due to the fact that most fastener means have been found not to be completely satisfactory for this purpose resort is often had to relying upon a rope which a passed through apertures provided in the cover member and this rope is then tied to some support.

Accoringly, the present invention contemplates the provision of a plastic socket member the perimeter of which is elliptical in configuration and includes a perforated base portion adapted to be secured to a planar surface.

Another improvement of this invention is to provide the plastic collar and its integrated base portion with a cylindrical recess extending therethrough.

A further object of the invention is to provide spaced, parallel, coextensive, flexible, leaf members constructed of a suitable plastic material which extend normal to the axial recess and longitudinally of the base member.

A still further object of the invention is to provide a cooperative head member for use with said socket member which includes an integral segmentally shaped operator means, depending shank portion and inverted frusto-conical locking means.

Still another object of the invention is to provide cooperative plastic head and socket fastener elements which are assembled into locking relation and capable of subsequent rotary movement by merely pushing the headed element into the complement socket portion.

These and other objects and advantages will become apparent upon a further reading of the following detailed description taken in conjunction with the drawings, in which:

FIG. 1 is a front elevational view of the clamping head;

FIG. 2 is a side elevational view of the same element turned 90°;

FIG. 3 is a top plan view of the same element;

FIG. 4 is a front elevational view of the socket member;

FIG. 5 is a side elevational view of the socket member;

FIG. 6 is a top plan view of the socket member showing the distortable leaves extending longitudinally of the socket member;

FIG. 7 is an assembled front view of the fastener with the socket shown in section and the head in elevation;

FIG. 8 is still another assembled sectional view of the elements taken on line VIII—VIII of FIG. 7;

FIG. 9 is a top plan view of the assemblied fastener elements in an unlocked condition relative to the cover;

FIG. 10 is a sectional view looking into the interior of the socket member showing the flexible members distorted by partial rotation of the shank, and FIG. 11 is a top plan view of the assembled fastener element in a cover-locking condition.

Turning now to the drawings in FIGS. 1 and 2, there is shown in front and side elevational views, respectively, the male fastener or clamp means which includes a segmentally shaped operator head 10 which is integral when a disc-like centering member 11 beneath which depends a rectangular shank 12 which merges into an inverted frusto-conical means 13 which includes a locking shoulder 14 that merges with the major diametrical edge portions of the rectangular shank.

As is best shown in FIGS. 4, 5 and 6, there are a series of views of a socket element 15 which include a substantially elliptical base portion 16 perforated as at 17 and 18 to adapt the socket to be fastened to a suitable surface.

Offstanding from the socket base portion 16 is a substantially elliptical collar 19, cylindrically apertured as at 20 and positioned longitudinally therein suitable, flexible or distortable plastic members 21 for a purpose that will be understood as the description progresses.

In the views of FIGS. 7 and 8, there are shown an assembled sectional and elevational view of the plastic separable fastener elements showing how the offstanding confronting surfaces of the leaf spring members 21 are adapted to snugly embrace the oppositely disposed walls of the rectangular shank element 12 and at which time the shoulder portion 14 of the frustum 13 will engage beneath the edges 22 of the leaf springs 21 thereby locking the male component member of the fastener relative to the complemental socket portion.

Considering now how the tarpaulin or other cover means is fastened to the elliptical collar of the socket member, reference is made to the view in FIG. 9. Assume, first that the tarpaulin (not shown) is provided with suitable grommets the perforations of each of which are of elliptical configuration and thereby conform to the elliptically contoured perimeter of the collar means 19. Thus, with the segmentally shaped operating means 10 positioned in the manner shown in FIG. 9, it will be apparent that the grommet can be passed down over the operator 10 about the collar 19 whereupon the operator 10 may be turned 90 degrees at which time it will assume the position shown in FIG. 11, consequently locking the grommet and the material to which it is fastened, by reason of the major diameter of the segmentally shaped operator means exceeding the minor diameter of the elliptical collar means 19, as is best shown in FIG. 11.

The fragmentary sectional view of FIG. 10 shows best the snap action which takes place when head 10 is rotated from the position shown in FIG. 9 to the position shown in FIG. 11. As soon as the major diameter of the shank 12 passes between the flexible plastic members 21—21, they cause the shank 12 to be snapped into either one or the other of the positions described, thus permitting positioning of an eyelet over the head 10 or its removal therefrom.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

That which is claimed is:

1. A fastener element including cooperative component members adapted to secure an eyelet member therebetween comprising in combination, a plastic socket member including a base portion having means defining an opening therein, parallel coextensive distortable means within said socket member, a rotatable head member for assembly with said socket member and having an operator means therefor, a depending shank portion carried by said operator including lock means carried at the free end thereof, said lock means including a generally conical wall extending therebeyond for distending the parallel coextensive means to facilitate introduction of the locking means between said distortable means thereby enabling subsequent relative rotation between the head and socket members to permit engagement of or removal therefrom of an eyelet member.

2. A fastener element as claimed in claim 1, wherein a disc-like centering member is integral with and interposed between the operator means and the shank portion carried thereby, said centering member being in operative engagement with the means defining the opening in said socket member.

3. A fastener element as claimed in claim 2, wherein the coextensive distoratble means are confined between and in rotatable slidable engagement with the centering means and the lock means.

References Cited
UNITED STATES PATENTS

| | | | |
|---|---|---|---|
| 1,287,220 | 12/1918 | Carr | 24—221 |
| 1,334,845 | 3/1920 | Dulac et al. | 24—221 |
| 1,357,186 | 10/1920 | Raeburn | 24—221 |
| 1,570,281 | 1/1926 | Raymond | 24—221 |
| 3,069,962 | 12/1962 | Rapata | 24—216 X |

WILLIAM FELDMAN, *Primary Examiner.*

MILTON S. MEHR, *Examiner.*